United States Patent
Lewis

(10) Patent No.: US 10,942,658 B2
(45) Date of Patent: Mar. 9, 2021

(54) SYSTEM AND METHOD FOR DYNAMIC SYSTEM MEMORY SIZING USING NON-VOLATILE DUAL IN-LINE MEMORY MODULES

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 16/171,818

(22) Filed: Oct. 26, 2018

(65) Prior Publication Data
US 2019/0129631 A1 May 2, 2019

Related U.S. Application Data

(60) Provisional application No. 62/577,665, filed on Oct. 26, 2017.

(51) Int. Cl.
*G06F 12/08* (2016.01)
*G06F 3/06* (2006.01)

(52) U.S. Cl.
CPC .......... *G06F 3/0626* (2013.01); *G06F 3/0638* (2013.01); *G06F 3/0679* (2013.01); *G06F 12/08* (2013.01)

(58) Field of Classification Search
None
See application file for complete search history.

(56) References Cited

U.S. PATENT DOCUMENTS

| | | | | |
|---|---|---|---|---|
| 9,552,176 | B2 * | 1/2017 | Lee | G06F 3/0685 |
| 2009/0144491 | A1 * | 6/2009 | Faucher | G06F 12/0893 |
| | | | | 711/106 |
| 2011/0208900 | A1 * | 8/2011 | Schuette | G06F 12/0866 |
| | | | | 711/103 |
| 2014/0325134 | A1 * | 10/2014 | Carpenter | G06F 12/1009 |
| | | | | 711/103 |
| 2015/0279463 | A1 * | 10/2015 | Berke | G11C 5/04 |
| | | | | 711/105 |
| 2016/0253123 | A1 * | 9/2016 | Jacob | G06F 13/1694 |
| | | | | 711/103 |
| 2017/0109058 | A1 * | 4/2017 | Shallal | G06F 3/065 |
| 2017/0249991 | A1 * | 8/2017 | Han | G11C 5/141 |
| 2018/0285252 | A1 * | 10/2018 | Kwon | G06F 12/0848 |

OTHER PUBLICATIONS

Chang et al., NVDIMM-N Cookbook: A Soup-to-Nuts Primer on Using NVDIMM-Ns to Improve Yoru Storage Performance. SNIA Global Education. Slideshow, 41 pages, (2015).
Rothman, Reducing Platform Boot Times. IDF2009, Intel Developer Forum, Best Technical Methods for Unified Extensible Firmware Interface (UEFI) Development. 45 pages, (2009).
(Continued)

*Primary Examiner* — Elias Mamo
(74) *Attorney, Agent, or Firm* — McCarter & English, LLP; John S. Curran

(57) ABSTRACT

A system and method for dynamically sizing system memory for a computing device using firmware and NVDIMMs is discussed. Additionally techniques for allocating between system memory and non-volatile storage on one or more NVDIMMs are discussed.

9 Claims, 6 Drawing Sheets

(56) References Cited

OTHER PUBLICATIONS

Sainio, NVDIMM—Changes are Here so What's Next? In-Memory Computing Summit. Slideshow, 22 pages, (2016).
Shimpi, Intel's Haswell Architecture Analyzied: Building a New PC and a New Intel. AnandTech, 28 pages, Oct. 5, 2012.
Uefi, vol. 1: Platform Initialization Specification. Pre-EFI Initialization Core Interface. Version 1.5. United EFI, Inc. 291 pages, Jul. 29, 2016.
Uefi, vol. 2: Platform Initialization Specification. Driver Execution Environment Core Interface. Version 1.5. United EFI, Inc. 240 pages, Jul. 28, 2016.
Uefi, vol. 3: Platform Initialization Specification. Shared Architectural Elements. Version 1.5. United EFI, Inc. 368 pages, Jul. 28, 2016.
Uefi, vol. 4: Platform Initialization Specification. Management Mode Core Interface. Version 1.5. United EFI, Inc. 358 pages, Jul. 28, 2016.
Uefi, vol. 5: Platform Initialization Specification. Standards. Version 1.5. United EFI, Inc. 376 pages, Jul. 28, 2016.

\* cited by examiner

SYSTEM AND METHOD FOR DYNAMIC SYSTEM MEMORY SIZING USING NON-VOLATILE DUAL IN-LINE MEMORY MODULES

RELATED APPLICATION

This application claims the benefit of, and priority to, U.S. Provisional Patent Application No. 62/577,665, filed Oct. 26, 2017, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto non-volatile Read-Only Memory (ROM) modules including, but not limited to, ROM, PROM, EPROM, EEPROM, and flash memory (collectively referred to hereafter as "ROM"). A characteristic of non-volatile memory is that it retains data when power is withdrawn. In contrast, volatile memory loses data in the absence of power. For example, volatile Random Access Memory (RAM) loses its data when a computer is shut down while the various types of non-volatile ROM maintain their data through shutdown and re-boot. Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). The UEFI specification describes a set of tools by which a computing device can move in an organized fashion from the power-applied state to fully operational. The specification tells the desired result but deliberately does not specify the internal tactic of implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

The ROM in a computing device may be partitioned into several functional divisions or regions. One such region is the code store which must be protected from alteration by any entity except for entities that have been authorized to update the code store. A second region called the Authenticated Variable Region or Store holds Authenticated Variables defined in the UEFI specification and is used to hold UEFI-defined security information (the security database). In addition to the UEFI-defined information the Authenticated Variable Store can be used to store user-defined data related to the ultimate uses of the computer. Because it contains security data and potentially sensitive user data, the UEFI specification provides that the Authenticated Variable Region/Store must be protected from alteration by any entity except those authorized by the presence of identifying key data within the security database. A third region, the UEFI variable store, contains lower security information which may be freely updated by user programs.

BRIEF SUMMARY

Embodiments of the present invention provide a system and method in which firmware partitions non-volatile dual in-line memory modules (NVDIMMs) as system memory and non-volatile storage on_systems where NVDIMMs that support memory-mapped Dynamic Random Access Memory (DRAM) cover all of memory. Further, in one embodiment, to increase system address space, a smaller amount of DRAM on the NVDIMM can be used as a cache holding most recently used (MRU) system addresses with a larger amount of flash memory on the NVDIMM providing additional slower memory.

In one embodiment, a computing device-implemented method for dynamically sizing system memory for the computing device uses firmware and NVDIMMs. The method detects, with the firmware, one or more NVDIMMs having a first amount of DRAM and a second amount of flash memory. The second amount is larger the first amount. The method also sets up a memory map of system memory address space for the computing device, via the firmware, with an identified amount of the flash memory as system memory. The identified amount of memory exceeds the first amount. The method further configures the first amount of DRAM to act as a MRU cache of system memory addresses and receives a memory access request for a requested address. The method accesses the requested address in the first amount of DRAM if the requested address is present and accesses the requested address in the identified amount of flash memory if the requested address is not present in the first amount of DRAM.

In another embodiment, a computing device with dynamically sized system memory includes at least one processor, an operating system, and one or more NVDIMMs having a first amount of DRAM and a second amount of flash memory. The second amount is larger the first amount. The computing device also includes firmware that when executed causes the computing device to detect the one or more NVDIMMs and set up a memory map of system memory address space for the computing device with an identified amount of the flash memory as system memory. The identified amount of memory exceeds the first amount. The firmware when executed further configures the first amount of DRAM to act as a Most Recently Used (MRU) cache of system memory addresses. When the computing device receives a memory access request for a requested address, the requested address is accessed in the first amount of DRAM if the requested address is present. The requested address is accessed in the identified amount of flash memory if the requested address is not present in the first amount of DRAM.

In a further embodiment, a computing device-implemented method for partitioning NVDIMMs between system memory and non-volatile storage, in a computing device that includes at least one processor, includes detecting, with the firmware, during memory initialization, one or more NVDIMMs with an amount of memory. The method also configures a first portion of the amount of memory as system memory for a memory map of system memory address space for the computing device and configures a second portion of the amount of memory on the one or more NVDIMMs as non-volatile storage.

In another embodiment, a computing device with allocatable system memory and non-volatile storage includes at least one processor, an operating system and one or more NVDIMMs with an amount of memory. The computing device also includes firmware that when executed causes the computing device to detect, during memory initialization, the one or more NVDIMMs, configure a first portion of the amount of memory as system memory for a memory map of system memory address space for the computing device, and configure a second portion of the amount of memory on the one or more NVDIMMs as non-volatile storage.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

NVDIMMs include both volatile DRAM (like a traditional DIMM) as well as slower but less expensive non-volatile flash memory and are being increasingly deployed in various computing platforms. The Joint Electron Device Engineering Council (JEDEC) provides standards for computer memory. JEDEC defines three types of NVDIMMs: NVDIMM-N, NVDIMM-F and NVDIMM-P.

An NVDIMM-N includes memory-mapped DRAM. Flash is not system mapped. Access methods include direct byte or block oriented access to DRAM. DRAM capacity may be 1-10 GB. DRAM latency is 10s of nanoseconds. The NVDIMM-N includes an energy source for backup.

An NVDIMM-F includes memory mapped flash but the DRAM is not system mapped. The NVDIMM-F provides block oriented access through a command buffer. NAND capacity may be 100s of GB to 1 TB. NAND latency is 10s of microseconds.

An NVDIMM classified as NVDIMM-P is a combination of the two other types of NVDIMMs and includes both memory mapped flash and memory mapped DRAM allowing for byte or block addressability. Capacity may be 100s of GB to 1 TB. Latency may be in the 100s of nanoseconds.

For NVDIMM-N one of the key aspects of current NVDIMM design is the use of super capacitors, also referred to herein as "super-caps", to ensure that all data that is in the NVDIMM's DRAM has been written back to the NVDIMM's flash before all power is lost. The super-caps act, in effect, as batteries to keep the NVDIMMs alive long enough to flush all unwritten data, in case of an unexpected power failure. Similar techniques are used with the NVDIMM-F to make sure all data is written to the flash "disk".

Figure 1:
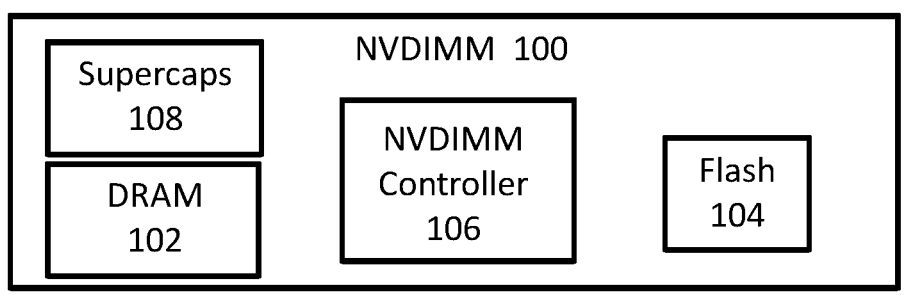
FIG. 1 (prior art) depicts an NVDIMM.

FIG. 1 (prior art) depicts an NVDIMM. The NVDIMM 100 includes volatile memory in the form of DRAM 102 and non-volatile memory in the form of flash memory 104. NVDIMM 100 also includes a NVDIMM memory controller 106. Supercaps 108 provide an emergency energy source to supply power in the event of a power loss so that data from DRAM 102 can be written to flash 104 in the event of an unexpected power loss.

Figure 2:
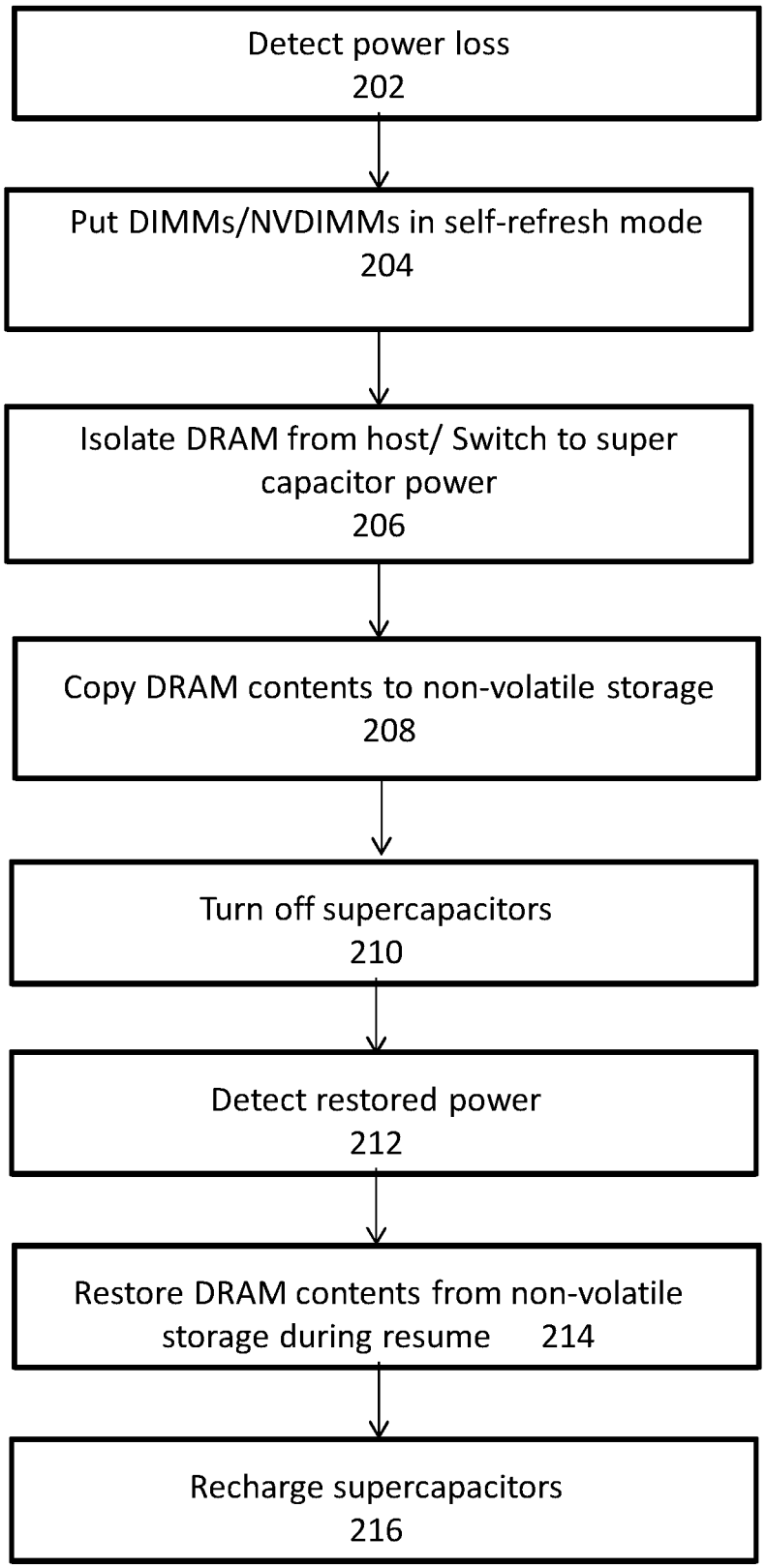
FIG. 2 (prior art) depicts a conventional sequence of steps in a computing device to respond to a detected sleep state request/loss of power using super capacitors.

As mentioned above, super capacitors are used to provide an emergency power source in the event of unexpected power loss. FIG. 2 (prior art) depicts a conventional sequence of steps in a computing device to respond to a detected loss of power using super capacitors. When the system detects an unexpected power loss (step 202) the firmware on the computing device puts the DIMMs/NVDIMMs in self-refresh mode (step 204). The DRAM is isolated from the host system and a switch is made for the DRAM to super capacitor power (step 206). The super capacitors supply enough power to copy the contents of DRAM to non-volatile storage (step 208). The non-volatile storage may be a hard drive or flash on an NVDIMM. Following completion of the copying the super capacitors may be turned off (step 210). Once a restoration of power is detected (step 212), the firmware initiates resume by beginning a boot sequence that restores DRAM contents from the non-volatile storage (step 214) and recharges the super capacitors (step 216).

During the boot sequence, the platform firmware is responsible for initializing memory on the computing platform and setting up the memory map. Embodiments of the present invention leverage the presence of both DRAM and flash on the NVDIMM to increase the reported size of system memory on the platform. For example, the NVDIMMs on the computing platform may be populated with a large amount of less expensive non-volatile flash memory (e.g.: 64 GB) and a smaller amount of more expensive and volatile DRAM (e.g.: 16 GB). In one embodiment, during memory initialization, firmware on the computing device may detect the NVDIMMS and report 64 GB of system memory corresponding to the 64 GB of the flash memory instead of reporting the 16 GB of DRAM. The firmware may configure the DRAM (16 GB) to operate as a cache of the most recently used (MRU) system addresses actually used. In an embodiment, the memory controller assigns address space ranges to DRAM on an N×1 basis. For example, with 64 GB of address space and 16 GB of DRAM, each byte of DRAM represents at least 4 different bytes of address space. The DRAM cache can only hold data for one of the N possible locations in the address space. Usually, the cache groups more than one byte together into a "line" that shares bits from the address. In a N×1 organization, at last M bits of data are associated with the DRAM cache line, where $2^M$ is the smallest number that is greater or equal to N. Whenever a new address is accessed that was not previously contained in the cache, the existing data within the line is flushed (either discarded, if never written, or written back) and the line associated with the new address is read in. This organization is established during the memory initialization code executed by the BIOS early in the booting process. This configuration allows a system with a smaller amount of the more expensive DRAM to act as if it had large amounts of DRAM. The flash memory, while slower than the DRAM in responding to requests, would still respond to read and write requests in the event the system address was not among the MRU addresses stored in the DRAM.

In one embodiment, the instruction to configure the platform to operate with the amount of flash as system memory instead of the amount of DRAM may be provided in a dynamic manner via a user-provided command through a UEFI BIOS or other BIOS set up menu or an operating system service based on the type of workload anticipated. In another embodiment, the configuration decision may be provided during manufacturing. In a further embodiment, the configuration decision may be programmatically performed by the firmware whenever it detects NVDIMMs with larger amounts of flash than DRAM. This configuration may be altered dynamically when additional NVDIMMs are hot-plugged into a system.

In another embodiment, the size of the system address space may be altered based on a tradeoff between system memory access speed vs. system address space size. For example: 128 GB of address space with only 16 GB of DRAM (8:1 ratio) would have a slower average access speed than a system with 16 GB of DRAM and 16 GB of allocated flash (1:1) ratio. This ability to resize would, in effect, add an automatic disk cache with configurable access times. It should be appreciated that different cache layouts may be specified. In one embodiment the CPU's cache line size and page size provide logical granularity, since the CPU may fill the internal cache in these amounts and pages have similar access semantics (e.g.: read only, execute only, read/write, etc.). In one embodiment, the platform firmware may track memory access speeds over a pre-determined time period and compare them to a pre-determined threshold. If the access speeds fail to meet the threshold, the firmware may set a flag to correspondingly adjust the addressable memory space allocations on the next boot sequence. In another embodiment, the operating system for the computing device may track memory access speeds over a pre-determined time period and compare them to a threshold. If the access speeds fail to meet the threshold, the firmware may set a flag to correspondingly adjust the addressable memory space allocations on the next boot sequence or may trigger a reset of the computing device to adjust the memory space allocation.

Figure 3:
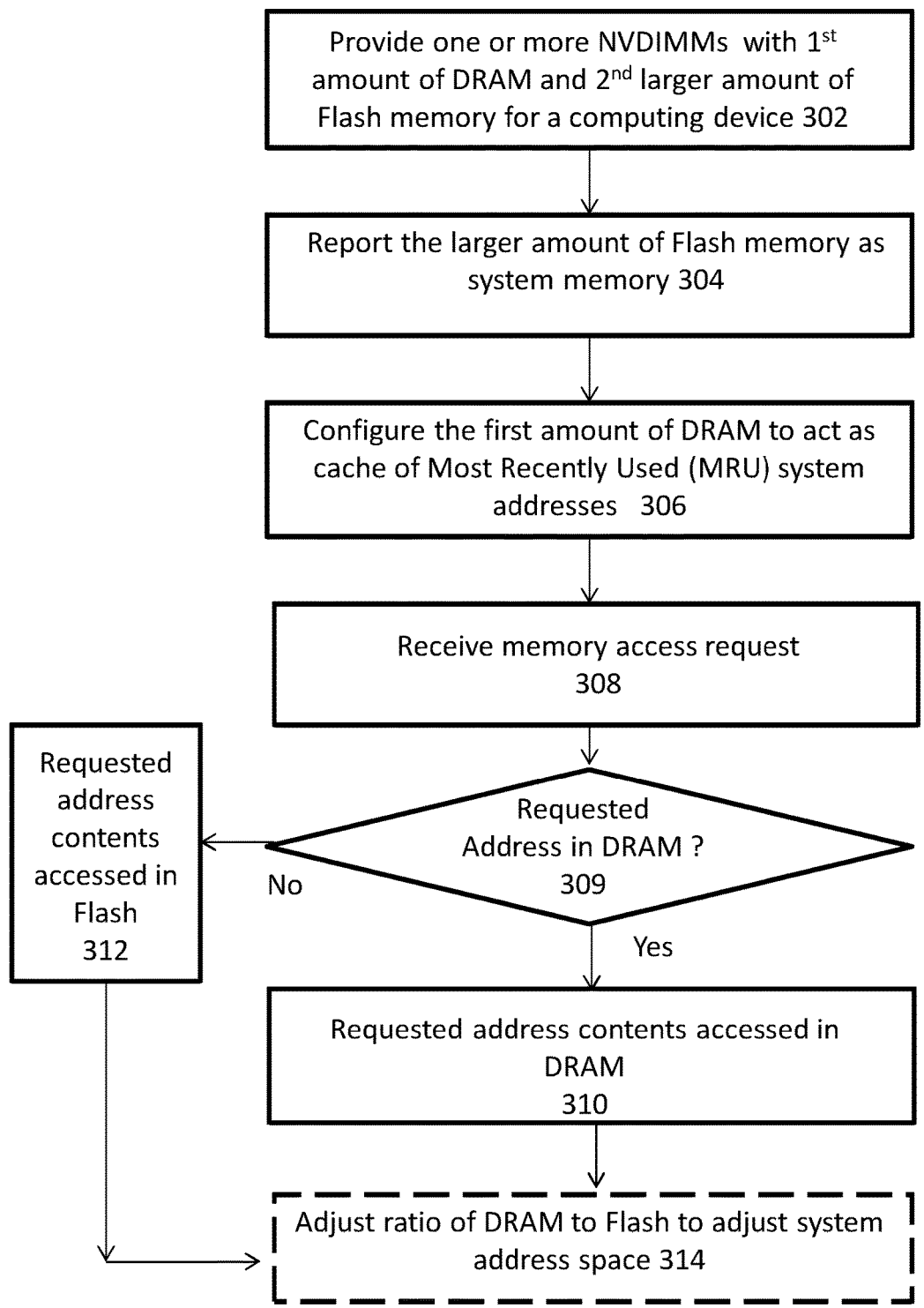
FIG. 3 depicts an exemplary sequence of steps in a computing device to dynamically size system memory in an exemplary embodiment.

FIG. 3 depicts an exemplary sequence of steps in a computing device to dynamically size system memory in an exemplary embodiment. In a computing device, one or more NVDIMMs are provided that include a first amount of DRAM and a larger amount of flash memory (step 302). The NVDIMMs also include a memory controller. The computing device's firmware, which is responsible for reporting the amount of memory on the computing device, reports the amount of system memory as equal to the larger amount of flash memory (step 304). The smaller first amount of DRAM is configured to act as an MRU cache of the most recently used system addresses (step 306). Subsequently a memory access request is received (e.g.: a read or write request) for a particular system memory address (step 308). If the requested system address is in the MRU cache of system addresses in DRAM (step 309) the requested address is accessed in the faster DRAM (step 310). If the requested system address is not in the MRU cache of system addresses in DRAM (step 309) the requested address is accessed in the slower flash memory (step 312). Subsequently the firmware may adjust the ratio of DRAM to flash to adjust the size of the system address space to either increase system memory access speed or to increase the overall size of the system memory address space (step 314). For example, the closer the ratio of DRAM to flash gets to 1:1 the faster the system memory access speed but the smaller the addressable space. In one embodiment, the adjustment of the system memory address space may take place in response to a user command entered via a BIOS set-up menu. In another embodiment, the adjustment may be initiated by a memory controller based on pre-determined criteria with respect to observed system memory access times. In one embodiment, the operating system may control the size of the system memory address space and issue a command to the firmware to adjust the size following a reset.

It should be appreciated that if the NVDIMM is also being used as a storage device then increasing the amount of system address space supported requires the firmware to also readjust the partition sizes of the flash block device contained in the other portion.

In another embodiment, a computing device may include an NVDIMM partitioned between system memory and block (non-volatile) storage. For example, a first portion of the available memory may be configured to be system memory while a much larger second portion may be configured to be high-performance non-volatile storage. As one non-limiting example, for a system with 1 TB on NVDIMMs, the first 64 GB may be configured to be system memory while the remainder may be configured as the high-performance non-volatile storage. The smaller portion that is configured to cover system memory acts like a NVDIMM-N, while the remainder of the memory on the NVDIMM would act as a NVDIMM-F or NVDIMM-P.

In one embodiment, the partitioning may occur when the computing device is originally manufactured. In another embodiment, the partitioning may occur dynamically when the firmware detects the NVDIMM during memory initialization during the boot sequence. In an embodiment, the partitioning may occur as a result of a user command such as, but not limited to, a command submitted via a UEFI BIOS or other BIOS setup menu.

Figure 4:
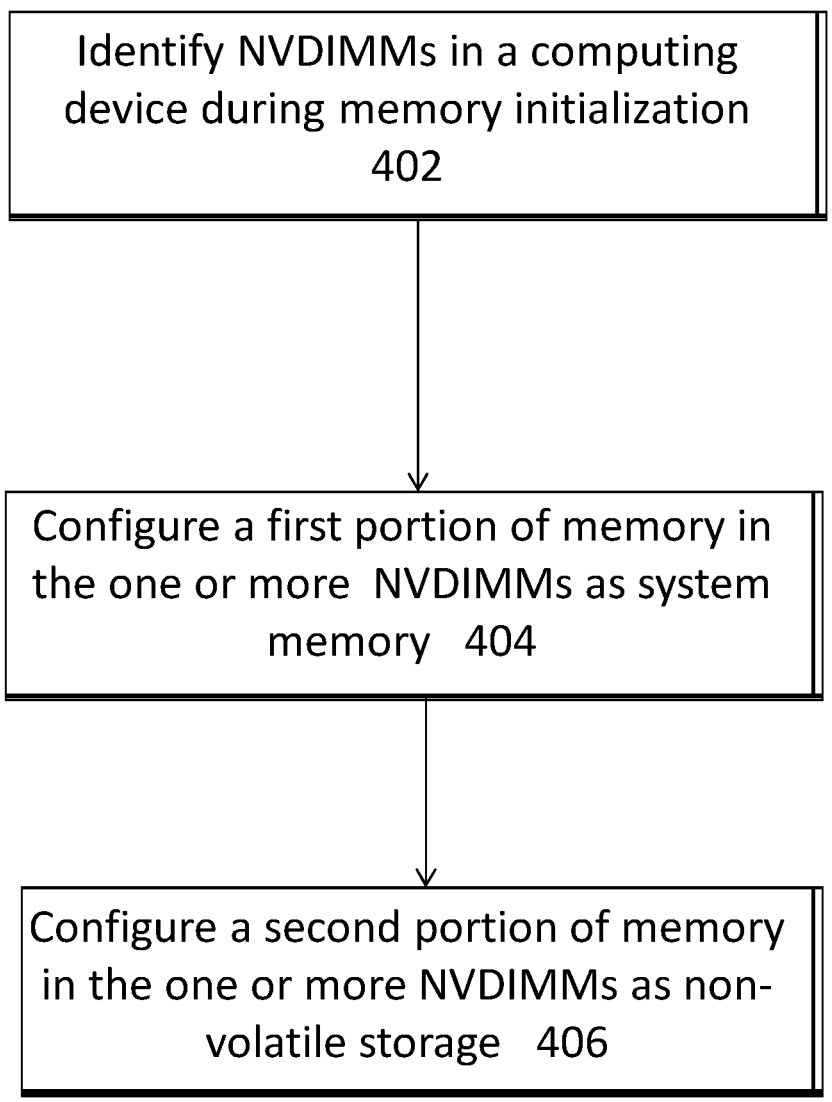
FIG. 4 depicts an exemplary sequence of steps in a computing device to configure NVDIMMs between system memory and non-volatile storage in an exemplary embodiment.

FIG. 4 depicts an exemplary sequence of steps in a computing device to configure NVDIMMs between system memory and non-volatile storage in an exemplary embodiment. The sequence begins by providing one or more NVDIMMs in a computing device (step 402). A first portion of memory in the one or more NVDIMMs is configured as system memory (step 404). A second portion of memory in the one or more NVDIMMs is configured as non-volatile storage (step 406).

In one embodiment, if the NVDIMM is also being used as a storage device, then increasing the amount of system address space supported requires readjusting the partition sizes of the flash block device contained in the other portion. In an alternate embodiment the same NVDIMM may include DRAM and a portion of flash configured as system memory and a remaining portion of the flash memory configured as block storage.

Figure 5:
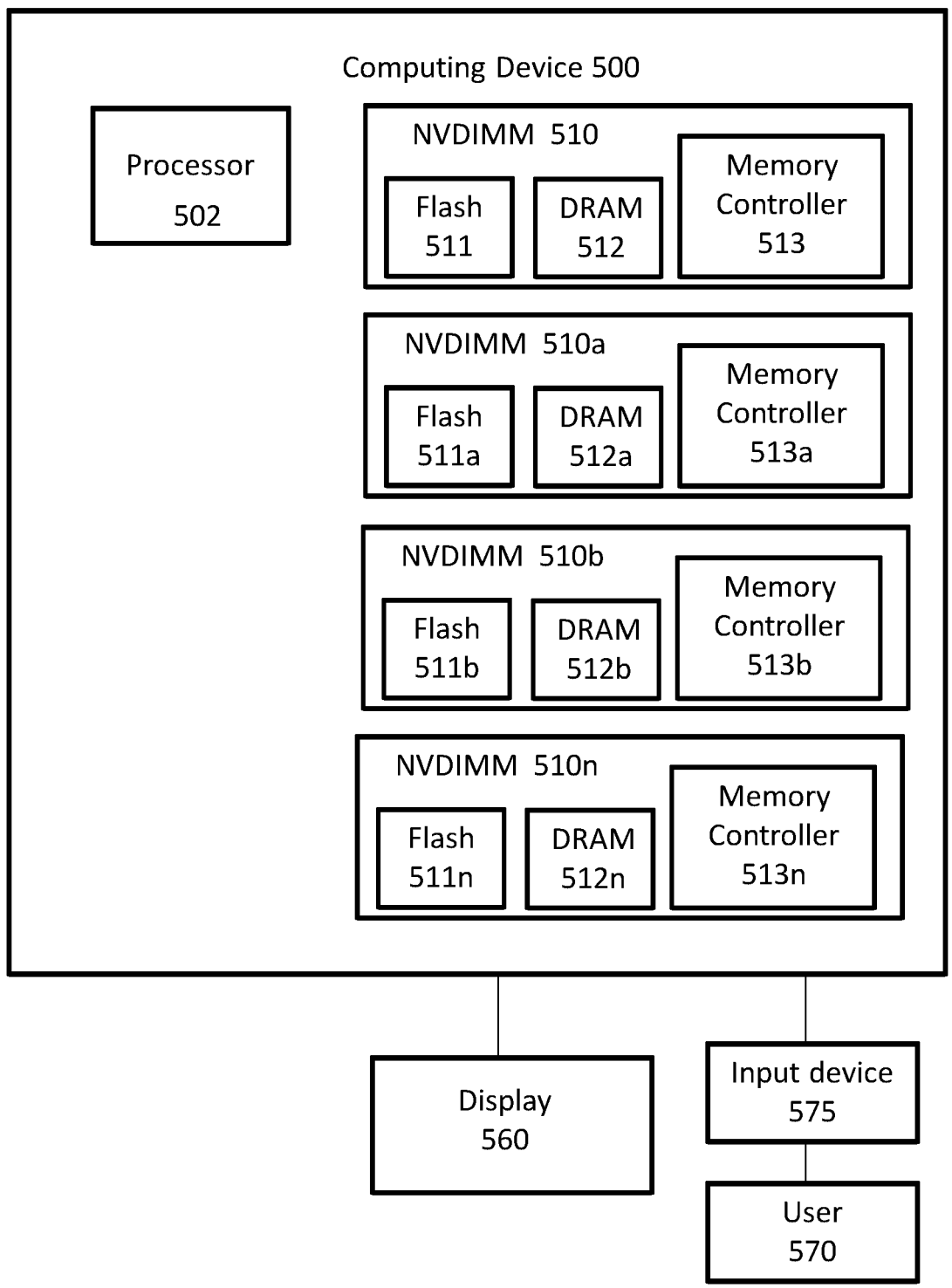
FIG. 5 depicts an exemplary computing device suitable for practicing an exemplary embodiment.

FIG. 5 depicts an exemplary computing device suitable for practicing an exemplary embodiment. The computing device 500 includes processor 502 and NVDIMMs 510, 510a, 510b and 510n. Each of the NVDIMMs 510, 510a, 510b and 510n respectively includes flash memory 511, 511a, 511b and 511n. The NVDIMMs 510, 510a, 510b and 510n further respectively include DRAM 512, 512a, 512b and 512n and memory controller 513, 513a, 513b, and 513n.

As noted above, the relative amounts of DRAM and flash memory allocated to system memory may be adjusted to control system memory access times as well as to control an amount of memory allocated to block storage.

Figure 6:
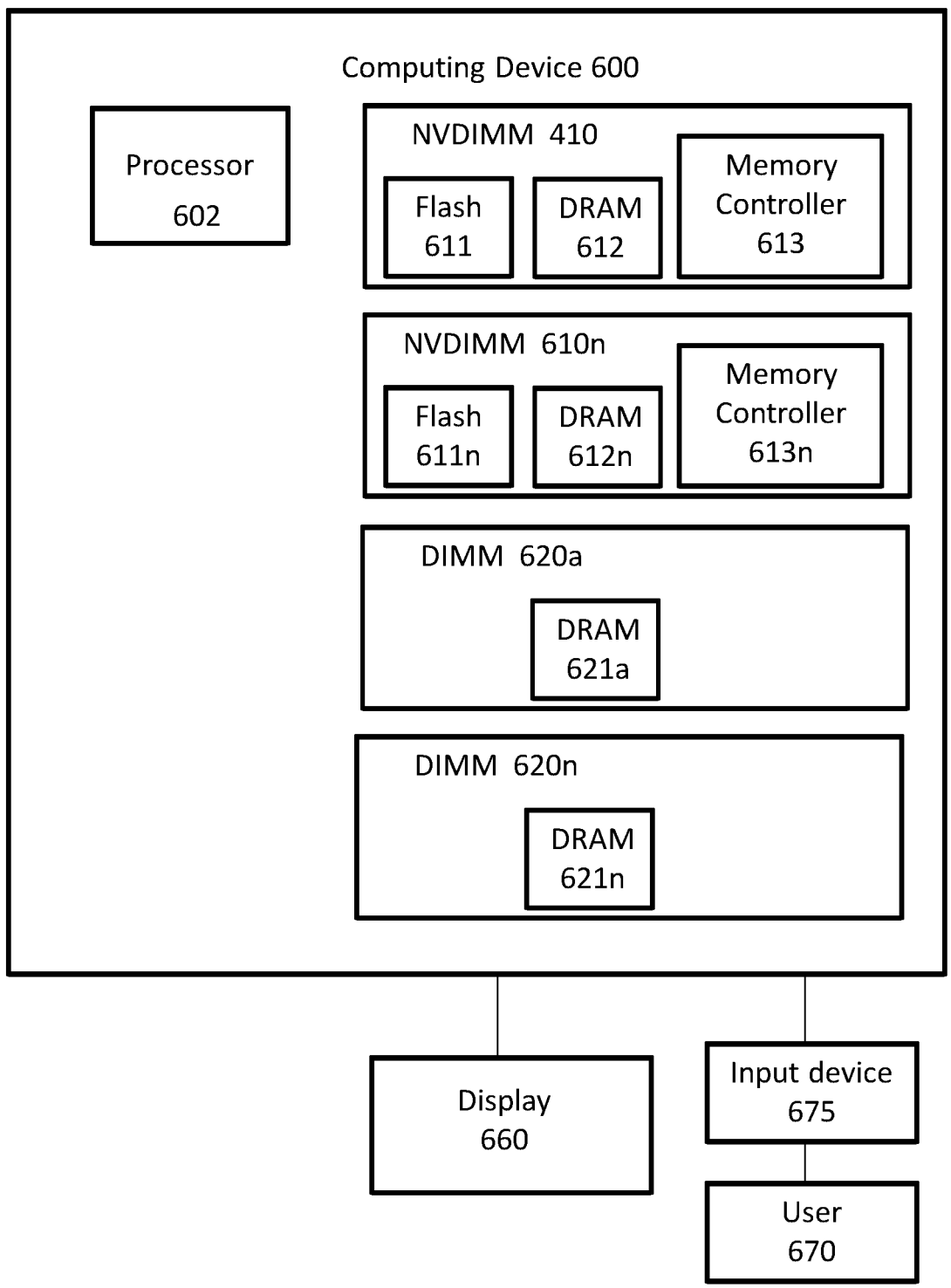
FIG. 6 depicts an exemplary computing device suitable for practicing an exemplary embodiment.

In another embodiment, not all of the memory modules on the computing device are NVDIMMs. For example, some memory modules may be DIMMs equipped with only RAM or SDRAM. In such a case, the firmware may allocate the RAM or SDRAM to system memory in addition to or instead to allocating the memory modules on NVDIMMs. FIG. 6 depicts an exemplary computing device suitable for practicing an exemplary embodiment. The computing device 600 includes processor 602 and NVDIMMs 610, 610n. Each of the NVDIMMs 610, 610n, respectively includes flash memory 611, 611n. The NVDIMMs 610, 610n further respectively include DRAM 612, 612n and memory controller 613, 613n. Computing device 600 further includes DIMMs 620a and 620n configured with DRAM 621a, 621n.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computing device-implemented method for dynamically sizing system memory for the computing device using firmware and non-volatile dual in-line memory modules (NVDIMMs), in a computing device that includes at least one processor, comprising:
   detecting, with the firmware, one or more NVDIMMs having a first amount of Dynamic Random Access Memory (DRAM) and a second amount of flash memory, the second amount larger the first amount;
   setting up a memory map of system memory address space for the computing device, via the firmware, with an identified amount of the flash memory as system memory, the identified amount of memory exceeding the first amount;
   configuring the first amount of DRAM to act as a Most Recently Used (MRU) cache of system memory addresses;
   receiving a memory access request for a requested address;
   accessing the requested address in the first amount of DRAM if the requested address is present;
   accessing the requested address in the identified amount of flash memory if the requested address is not present in the first amount of DRAM;
   tracking a memory access time for a pre-determined period of time; and
   adjusting, with the firmware, a ratio of DRAM to flash memory to adjust a size of the system memory address space on the computing device, the adjusting of the ratio programmatically triggered by the firmware following a comparison of the memory access time to a pre-determined threshold.

2. The method of claim 1 wherein the identified amount is the second amount of flash memory.

3. The method of claim 1, wherein the adjusting is triggered based on a user command submitted via a setup menu.

4. The method of claim 1, wherein the adjusting is programmatically triggered by an operating system for the computing device based on a memory access time tracked for a predetermined period of time and compared to a pre-determined threshold.

5. A non-transitory medium holding computer-executable instructions for dynamically sizing system memory for the computing device using firmware and non-volatile dual in-line memory modules (NVDIMMs), in a computing device that includes at least one processor, the firmware when executed causing the computing device to:
   detect one or more NVDIMMs having a first amount of Dynamic Random Access Memory (DRAM) and a second amount of flash memory, the second amount larger the first amount;
   set up a memory map of system memory address space for the computing device with an identified amount of the flash memory as system memory, the identified amount of memory exceeding the first amount;
   configure the first amount of DRAM to act as a Most Recently Used (MRU) cache of system memory addresses;
   track a memory access time for a pre-determined period of time; and
   adjust a ratio of DRAM to flash memory to adjust a size of the system memory address space on the computing device, the adjusting of the ratio programmatically triggered by the firmware following a comparison of the memory access time to a pre-determined threshold, wherein when the computing device receives a memory access request for a requested address:
   the requested address is accessed in the first amount of DRAM if the requested address is present; and
   the requested address is accessed in the identified amount of flash memory if the requested address is not present in the first amount of DRAM.

6. The medium of claim 5, wherein the identified amount is the second amount of flash memory.

7. The medium of claim 5, wherein the adjusting is triggered based on a user command submitted via a setup menu.

8. The medium of claim 5, wherein the adjusting is programmatically triggered by an operating system for the computing device based on a memory access time tracked for a pre-determined period of time and compared to a pre-determined threshold.

9. A computing device with dynamically sized system memory, the computing device comprising:
   at least one processor;

an operating system;

one or more non-volatile dual in-line memory modules (NVDIMMs) having a first amount of Dynamic Random Access Memory (DRAM) and a second amount of flash memory, the second amount larger the first amount; and firmware, the firmware when executed causing the computing device to:

detect the one or more NVDIMMs;

set up a memory map of system memory address space for the computing device with an identified amount of the flash memory as system memory, the identified amount of memory exceeding the first amount;

configure the first amount of DRAM to act as a Most Recently Used (MRU) cache of system memory addresses;

track a memory access time for a pre-determined period of time; and adjust a ratio of DRAM to flash memory to adjust a size of the system memory address space on the computing device, the adjusting of the ratio programmatically triggered by the firmware following a comparison of the memory access time to a pre-determined threshold, wherein when the computing device receives a memory access request for a requested address:

the requested address is accessed in the first amount of DRAM if the requested address is present; and the requested address is accessed in the identified amount of flash memory if the requested address is not present in the first amount of DRAM.

* * * * *